United States Patent
Uddenberg et al.

(10) Patent No.: US 7,210,065 B2
(45) Date of Patent: Apr. 24, 2007

(54) METHODS AND STRUCTURE FOR TESTING RESPONSES FROM SAS DEVICE CONTROLLERS OR EXPANDERS

(75) Inventors: David Uddenberg, Colorado Springs, CO (US); William Voorhees, Colorado Springs, CO (US); Mark Slutz, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 495 days.

(21) Appl. No.: 10/798,680

(22) Filed: Mar. 11, 2004

(65) Prior Publication Data

US 2005/0204197 A1    Sep. 15, 2005

(51) Int. Cl.
*G06F 11/00* (2006.01)
(52) U.S. Cl. .......................................................... 714/33
(58) Field of Classification Search ................... 714/33, 714/37, 43, 56, 39
See application file for complete search history.

(56) References Cited

U.S. PATENT DOCUMENTS

| | | | | |
|---|---|---|---|---|
| 5,033,049 A | * | 7/1991 | Keener et al. ................. | 714/33 |
| 6,035,425 A | * | 3/2000 | Caldwell et al. ............... | 714/52 |
| 6,954,712 B2 | * | 10/2005 | Bingham et al. ........... | 702/123 |
| 6,986,083 B2 | * | 1/2006 | Gygi et al. .................. | 714/719 |
| 7,000,170 B2 | * | 2/2006 | Slutz et al. .................. | 714/758 |
| 2003/0023904 A1 | * | 1/2003 | Yamaguchi et al. .......... | 714/28 |

* cited by examiner

*Primary Examiner*—Nadeem Iqbal
(74) *Attorney, Agent, or Firm*—Duft, Bornsen & Fishman

(57) ABSTRACT

Improved methods and structures for testing of SAS components, in situ, in a SAS domain. A first SAS component is adapted to generate stimuli such as error conditions to elicit a response to the error condition from a second SAS component coupled to the first in the intended SAS domain configuration. In one aspect, a SAS device controller generates stimuli applied to a SAS expander coupled thereto and verifies proper response from the SAS expander. In another aspect, a SAS expander generates stimuli applied to a SAS device controller coupled thereto and verifies proper response from the SAS device controller. Stimuli may be generated by custom circuits or firmware/software within the first component. Vendor specific SAS SMP transactions may be used to cause the first component to enter the special verification mode.

22 Claims, 3 Drawing Sheets

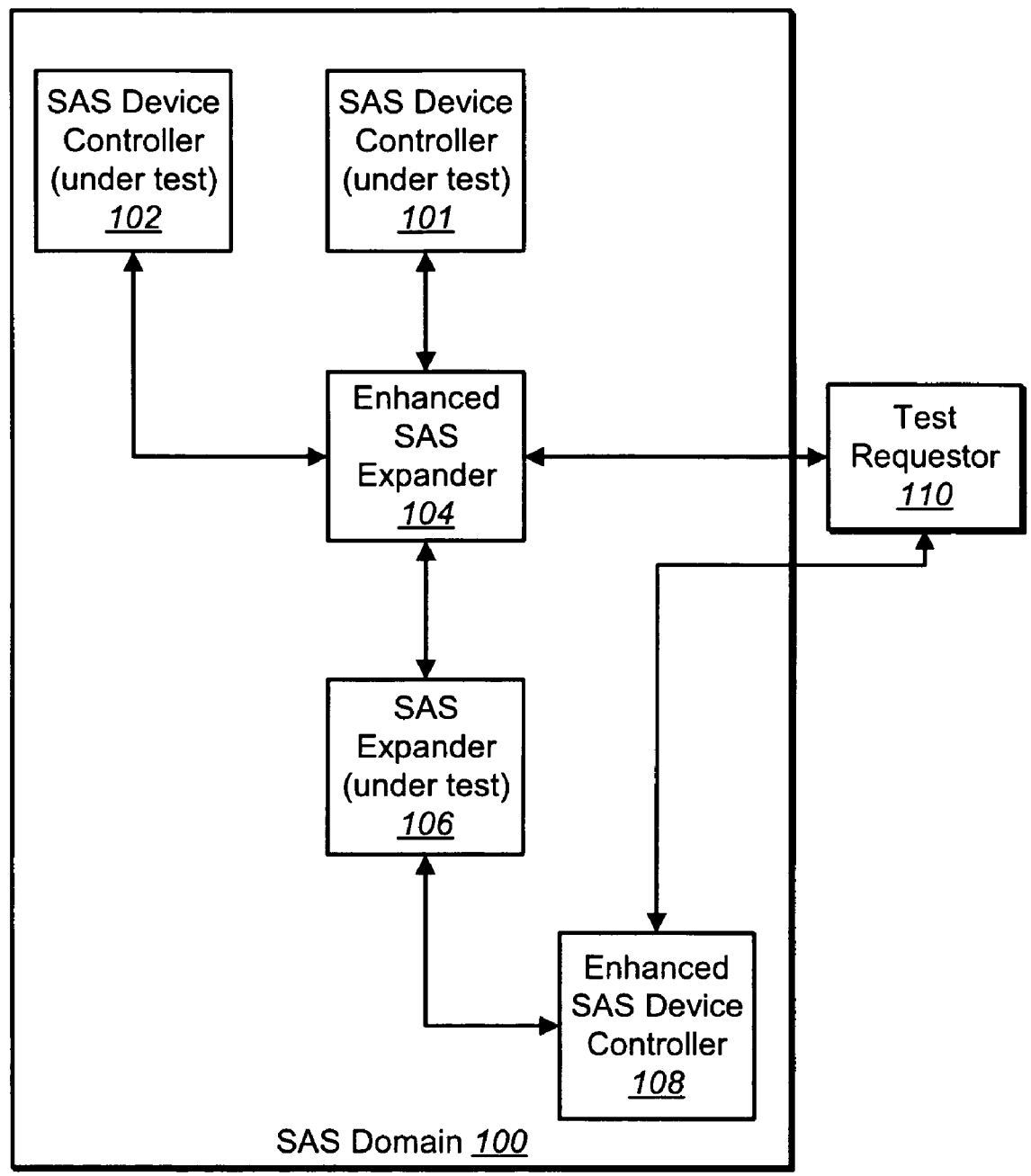
FIG._1

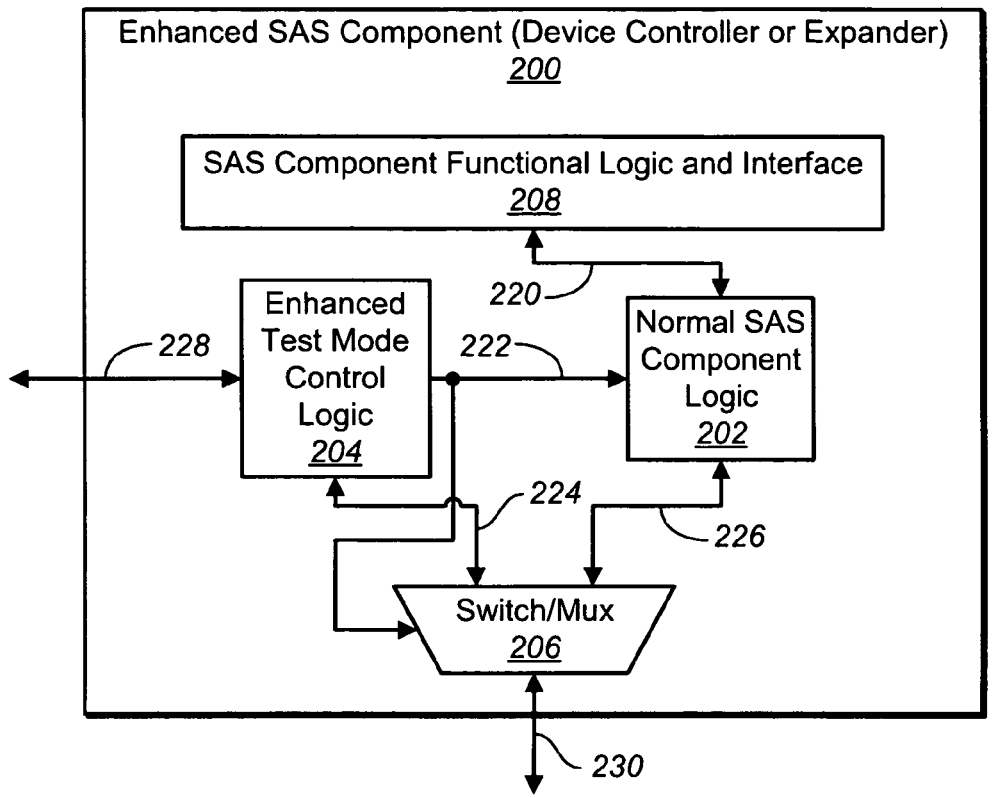
FIG._2
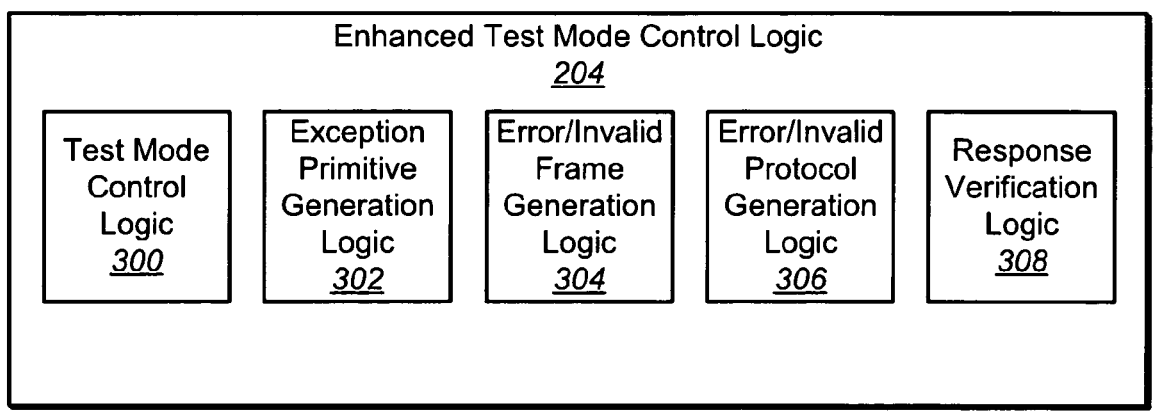
FIG._3

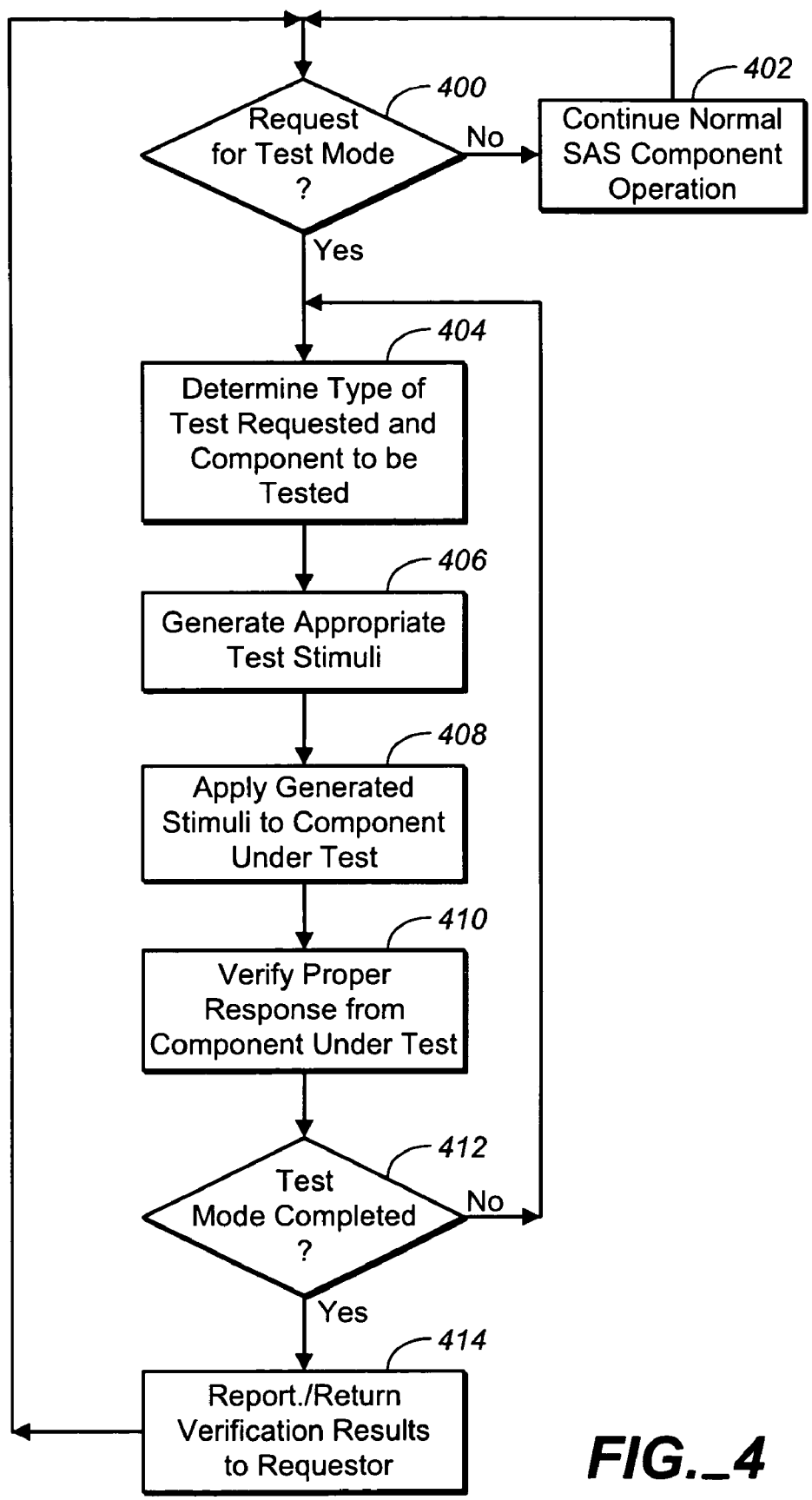
FIG._4

METHODS AND STRUCTURE FOR TESTING RESPONSES FROM SAS DEVICE CONTROLLERS OR EXPANDERS

BACKGROUND OF THE INVENTION

1. Field of the Invention

The invention relates generally to serial attached SCSI ("SAS") domains and more specifically to testing of responses to stimuli applied to SAS device controllers or SAS expanders.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, Compact Disc-Read Only Memory ("CD-ROM") drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

It is a particular problem to thoroughly test SAS device controllers and SAS expanders as regards the full complement of possible responses to command, status or data exchanges and associated anomalous conditions. For example, it is a particular difficulty to verify proper operation of a SAS device controller or SAS expander in response to certain anomalous communication conditions such as BREAK, BROADCAST, and NAK conditions, or CRC errors, or invalid protocols or packets, etc.

Prior techniques address this testing dilemma through external SAS emulators to generate a variety of stimuli including anomalous conditions and SAS analyzers to detect and verify the response from the SAS device controller or SAS expander under test. An exemplary SAS emulator may be programmed by a user to generate particular desired sequences and apply the desired sequences as a stimulus to the attached SAS expander or SAS device controller. The response generated may then be captured and analyzed to verify proper operation. Though the emulation and analyzer features may be integrated in a single test component, such external SAS analyzers and emulators can be costly devices. Furthermore, coupling an external test component to the SAS device controller or SAS expander under test may induce undesirable characteristics into the system under test. Since the external SAS analyzer or emulator must couple into the transport media coupled to the SAS device controller or SAS expander under test, by definition the analysis and testing is not performed in a real world environment in which the system may be normally configured.

It is evident from the above discussion that a need exists for improved testing of SAS device controllers and SAS expanders in an environment more closely resembling real world application environments in which the SAS device controller or SAS expander may be configured.

SUMMARY OF THE INVENTION

The present invention solves the above and other problems, thereby advancing the state of the useful arts, by providing methods and structures for improved testing of SAS device controllers and SAS expanders in an environment closely resembling a real world environment in which such devices and expanders are applied. In one aspect hereof, the responses of a SAS device controller under test may be analyzed based upon stimuli generated by a SAS expander suitably programmed and applied to the SAS device controller over an appropriate transport medium. In such a test environment, responses of the SAS device controller may be evaluated in an environment more closely resembling the intended application environment for the SAS device controller (i.e., coupled to the SAS expander through the transport medium intended for such use). In another aspect hereof, responses of a SAS expander under test may be analyzed based upon stimuli generated by a SAS device controller suitably programmed and applied to the SAS expander over an appropriate transport medium. In such a test environment, responses of the SAS expander may be evaluated in an environment more closely resembling the intended application environment for this SAS expander (i.e., coupled to the SAS device controller through the transport medium intended for such use).

A feature hereof therefore provides a method for testing a SAS component in situ in a SAS domain, the method comprising: generating a stimulus representing an anomalous condition within a first SAS component; applying the stimulus to a second SAS component coupled to the first SAS component; receiving within the first SAS component a response from the second SAS component; and verifying within the first SAS component the received response.

Another aspect hereof further provides that the first SAS component is a SAS device controller and the second SAS component is a SAS expander.

Another aspect hereof further provides that the first SAS component is a SAS expander and the second SAS component is a SAS device controller.

Another aspect hereof further provides that step of generating comprises generating an exception primitive.

Another aspect hereof further provides that the step of generating an exception primitive comprises generating at least one of: BREAK, BROADCAST, NAK, and ERROR.

Another aspect hereof further provides that the step of generating comprises generating invalid frames.

Another aspect hereof further provides that the step of generating invalid frames comprises generating at least one of: a frame with a CRC error, an invalid SMP Response frame, an illegal frame type, a frame with an invalid SAS address, a frame representing an invalid SAS protocol a frame indicating an invalid connection rate, a character representing an invalid primitive, and a frame with an invalid SMP function.

Another aspect hereof further provides for configuring the first SAS component to enable testing operation.

Another aspect hereof further provides that the step of configuring comprises: transmitting an SMP Request to the first SAS component requesting that the first SAS component commence testing operation of the second SAS component.

Another aspect hereof further provides that the SMP Request is a vendor specific SMP Request.

Another feature hereof provides for a system comprising: a SAS communication medium; a first SAS component coupled to the SAS communication medium; a second SAS component coupled to the SAS communication medium wherein the second SAS component is adapted to generate a stimulus representing an anomalous condition and wherein the second SAS component is further adapted to apply the generated stimulus to the first SAS component.

Another aspect hereof further provides that the second SAS component is further adapted to verify a response received from the first SAS component in response to the generated stimulus applied to the first SAS component.

Another aspect hereof further provides that the second SAS component is adapted to selectively enable generation of the stimulus.

Another aspect hereof further provides that the second SAS component is selectively enabled to generate the stimulus in response to a vendor specific SMP Request received by the second SAS component.

BRIEF DESCRIPTION OF THE DRAWINGS

FIG. 1 is a block diagram of a SAS domain embodying features and aspects hereof.

FIG. 2 is a block diagram of an exemplary enhanced SAS component in accordance with features and aspects hereof.

FIG. 3 is a block diagram providing a function/logical decomposition of an enhanced test mode control elements in accordance with features and aspects hereof.

FIG. 4 is a flowchart describing methods of operation of an enhanced SAS component in accordance with features and aspects hereof.

DETAILED DESCRIPTION OF THE DRAWINGS

FIG. 1 is a block diagram of an exemplary SAS domain 100 including features and aspects hereof. SAS domain 100 consists of a plurality of SAS devices (some acting as initiators and some acting as targets) and one or more SAS expander components to permit flexible expansion and configuration of ports coupling the various SAS devices to one another. As shown in FIG. 1, SAS device controllers 101, 102 and 108 are coupled to one another through SAS expanders 104 and 106. Though not shown, it is common for devices to be coupled through multiple paths and/or multiple expanders. In other words, multiple redundant ports and paths may be employed to couple devices and expanders to one another.

"SAS component" as used herein refers to SAS devices (or SAS device controllers—whether initiators or targets) as well as SAS expanders. "SAS device controller" as used herein refers to control logic features within a SAS device used for coupling the SAS device to the SAS domain. Such a SAS device controller may be implemented as standard or customized circuits providing logic for interacting with other SAS components of a SAS domain in accordance with SAS specifications. Further, such a SAS device controller may be implemented as programmed instructions executed by a suitably programmable general or special purpose processor. Such design choices to implement as custom or standard circuits or as programmed instructions are well known to those of ordinary skill in the art.

Similarly, SAS expanders (such as expanders 104 and 106) may be implemented as customized or standard integrated circuit components or other electronic circuit designs. Often, such SAS expander circuit designs include programmable general or special purpose processors such that various logic and control features of the SAS expander may be provided by suitably programmed instructions. The enhanced test mode features and aspects hereof may therefore be implemented within the circuits or programmed instructions of the SAS expander. Such design choices for SAS expander components are well known to those of ordinary skill in the art.

In accordance with features and aspects hereof, a SAS device controller 108 may be enhanced to test functionality of a SAS expander (i.e., SAS expander 106 coupled to enhanced SAS device controller 108). Features and aspects hereof operable within enhanced SAS device controller 108 may implement testing of SAS expander 106 by generating stimuli and applying the stimuli to the SAS expander to test a variety of responses from SAS expander 106. More specifically, numerous anomalous conditions may be generated by creating appropriate stimuli within enhanced SAS device controller 108 and applying the generated stimuli to SAS expander under test 106. The anomalous conditions may include any of several exception and error conditions not frequently encountered in normal operation of SAS domain 100.

In like manner, SAS expander 104 is enhanced in accordance with features and aspects hereof to permit testing of SAS device controllers 101 and 102 coupled thereto. As above with respect to enhanced SAS device controller 108, enhanced SAS expander 104 may include custom or standard circuits or logic for generating anomalous condition stimuli to be applied to SAS device controllers under test 101 and 102.

More generally, FIG. 1 therefore shows a variety of examples where a first SAS component is operable to test operations of a second SAS component. For example, first SAS component 108 is operable to test operation of second SAS component expander 106. Or, for example, first SAS component 104 is operable to test second SAS components 101 and 102. In accordance with testing features and aspects hereof discussed further herein below, a first SAS component generates stimuli representing any of several anomalous conditions not frequently encountered during normal operation of SAS domain 100. The stimuli so generated are applied by the first SAS component to the second SAS component (the SAS component under test). The second SAS component will receive the generated stimuli and, if operating properly, will generate an appropriate response in accordance with SAS specifications and protocols. The first SAS component receives the response generated by the second SAS component and verifies propriety of the received response with respect to corresponding SAS specifications and protocols.

The first SAS component may be directed to enter a test mode to commence such testing operations by any means including, for example, an external request such as test requestor 110 of FIG. 1. Test requestor 110 therefore represents any means for signaling the first SAS component to enter a test mode in accordance with features and aspects hereof. In accordance with features and aspects hereof, test requester 110 may include logic internal to SAS domain 100 (not shown) or external from SAS domain 100 (as shown). Further, the logic of test requestor 110 may be incorporated within the first SAS component and actuated in response to external user input (not shown). Where, for example, the first SAS component is a SAS device controller, the system which incorporates the SAS device controller logic may provide signals outside the normal band of SAS domain communication directing the SAS device controller circuits to enter test mode in accordance with features and aspects hereof. In another example, where the first SAS component is a SAS expander enhanced in accordance with features and aspects hereof, a SAS device coupled to a port of the SAS expander may instruct the SAS expander to enter the test mode features and aspects hereof by transmitting an appropriate message to the enhanced SAS expander. The message so transmitted and received indicates to the SAS expander that it should commence testing of one or more SAS devices coupled to the SAS expander. In one aspect hereof, such a message may be transmitted and received as a SAS SMP message request message. More specifically, in another aspect hereof, the message may be a SAS SMP request providing a vendor unique function or code to request that the SAS expander commence testing of one or more attached SAS devices.

FIG. 1 also shows a first SAS component (SAS device controller 108) coupled directly to a second SAS component (SAS device controller 112) and adapted to test responses generated by SAS device controller 112. This configuration demonstrates another variant of SAS topologies, as known to those of ordinary skill in the art, wherein SAS devices are directly coupled (i.e., initiator to target) without need for an intermediate SAS expander.

Those of ordinary skill in the art will recognize a wide variety of equivalent SAS domain topologies and architectures wherein features and aspects hereof to provide enhanced testing of SAS components may be provided. A particular feature and aspect hereof provides that the testing performed is within the SAS domain 100 as generally configured for the desired application. In other words, the testing performed by features and aspects hereof is performed in situ within the SAS domain 100 configured as desired for its intended application. By contrast with previous techniques and structures using external analyzers and emulators, features and aspects hereof are capable of testing SAS devices and SAS expanders (i.e., SAS components) in an environment more closely related to that in which they are intended to operate for a particular application.

FIG. 2 is a block diagram providing additional detail of an exemplary enhanced SAS component 200 operable in accordance with features and aspects hereof as a first SAS component to provide testing of a second SAS component coupled thereto. Enhanced SAS component 200 may include SAS component functional logic and interface 208 to provide any requisite functions for control of the SAS component and/or for interfacing between the SAS component and a system incorporating the component (such as a system incorporating a SAS device controller). Normal SAS component logic 202 is coupled to SAS component functional logic and interface 208 via path 220. Normal SAS component logic 202 provides standard SAS interface and protocol management and control in accordance with standard SAS specifications and protocols.

In response to functions requested through SAS component functional logic and interface 208 and applied to normal SAS component logic 202 via path 220, SAS protocol exchanges are performed via path 226 through switch/multiplexer 206 and applied to SAS transport medium 230. Elements 208 and 202 and the associated paths through the SAS transport medium 230 therefore provide for normal operation of the enhanced SAS component 200. Normal SAS component operation transmitting and receiving SAS messages performed by a SAS device controller or a SAS expander may be controlled and managed through these components and internal paths.

In accordance with the enhanced test mode features and aspects hereof, enhanced SAS component 200 may include enhanced test control test mode control logic 204. Enhanced test mode control logic 204 provides test mode features for generating stimuli representing anomalous conditions, applying the generated stimuli via path 224 through switch/multiplexer 206 onto SAS transport medium 230, and for verifying responses received via medium 230 through switch/multiplexer 206 on path 224.

Enhanced test mode control logic 204 may receive a signal on path 228 requesting entry to the enhanced test mode. As noted above, such a signal may be generated by any desired means, including means internal to enhanced SAS component 200 (not shown) or means external to enhanced SAS component 200. In particular, as discussed above, the signal to commence such enhanced testing may be provided as a SAS SMP Request transmitted to the SAS component on one of its ports. Further, a signal to commence test mode operations may be provided to a SAS device controller via a system bus coupling the SAS device controller to an associated system. For example, a PCI bus may be used by a host system to instruct a SAS device controller within the system to initiate the test mode operations.

In response to such a request to commence test mode operation, enhanced test mode control logic 204 applies a signal to path 222 indicating entry to the enhanced test mode operation. The signal so applied on path 222 may be applied to normal SAS component logic 202 to inform the normal processing functions and features thereof that test mode of operation has commenced and normal operation may not proceed. In addition, the test mode signal applied to path 222 may be applied to switch/multiplexer 206 to selectively couple path 224 to SAS transport medium 230. When in normal operation, switch/multiplexer 206 is selectively controlled to apply SAS exchanges from path 226 to path 230. In test mode operation, switch/multiplexer 206 is selectively controlled to apply transactions representing anomalous conditions on path 224 through to path 230.

Those of ordinary skill in the art will recognize a wide variety of equivalent logical and functional decompositions of features and aspects within enhanced SAS component 200. FIG. 2 is therefore merely intended to suggest one possible decomposition of functions and logic within enhanced SAS component 200 to provide for both normal operation of the SAS component and enhanced test mode operation thereof.

FIG. 3 provides additional detail of typical functional elements within enhanced test mode control logic 204 of FIG. 2. Test mode control logic 300 provides functions to receive or detect a request to enter the enhanced test mode of operation and to appropriately signal related logic to cease normal operation of the associated SAS component. Exception primitive generation logic 302 is operable upon entry to test mode in response to logic 300 to generate any requested exception primitives such as BREAK, BROADCAST, NAK and ERROR primitives. Error/invalid frame generation logic 304 is operable in the test mode operation to generate any requested erroneous or invalid frames including, for example, invalid frame types, invalid SAS addresses, CRC errors, etc. Error/invalid protocol generation logic 306 is operable in the enhanced test mode operation to generate any requested erroneous or invalid protocol sequences in accordance with the SAS specifications. Response verification logic 308 is operable to receive responses generated by the second SAS component (i.e. the SAS component under test having received a generated stimulus) to verify propriety of the received responses in accordance with the applied stimulus and the SAS specifications.

Test mode control logic 300 is cooperatively operable with logic 302, 304, 306 and 308 to initiate desired sequences of anomalous conditions. A test request signal received by a test mode control logic 300 (i.e., from means internal to the associated SAS component or externalized thereto) may include indicia representing the type of anomalous condition or conditions to be generated as stimuli and applied to the second SAS component under test. Further, the signal or message received by logic 300 may indicate the second SAS component or components to be tested in the requested test mode operation.

Those of ordinary skill in the art will recognize that the functional and logical decomposition represented by FIG. 3 is intended merely as exemplary of numerous equivalent functional and logical decompositions of such a test mode control logic element.

FIG. 4 is a flowchart describing a method of operation within a first SAS component to provide enhanced testing of a second SAS component in accordance with features and aspects hereof. In particular, the flowchart of FIG. 4 is operable in accordance with features and aspects hereof to generate stimuli representing anomalous conditions in a SAS communication exchange and to verify proper response thereto. Stimuli are generated by the first SAS component and applied to the second SAS component. The responses generated by the second SAS component are returned to the first SAS component and verified therein relative to SAS specifications. Results of the test and verification may then be reported or otherwise returned to an associated test requestor for appropriate processing.

Element 400 is first operable to await a request to enter the enhanced test mode. As noted above, such a request may be provided as a signal from within the first SAS component or external to the first SAS component. Until such a request is detected by the first SAS component, element 402 is operable to continue normal SAS component operation. Processing then continues looping back to element 400 to await detection of a request to enter the enhanced test mode.

Upon detecting a request to enter the enhanced test mode by element 400, element 404 is operable to determine the type of test requested and the component to be tested. As noted above, the signal or message requesting entry to the enhanced test mode may include indicia of the particular type of test or tests to be performed and may further include indicia of the particular SAS component or components to be tested. Those of ordinary skill in the art will recognize a variety of methods and structures for providing such indicia of tests to be performed and the components to be tested. Such options represent well known design choices to those of ordinary skill in the art.

Element 406 is next operable to generate appropriate test stimuli. As noted, the stimuli may represent anomalous conditions not frequently encountered in normal operation of the second SAS component (the identified SAS component to be tested). Examples of such anomalous conditions are numerous and may include the following:

Exemplary Exception Primitives:
  BREAK
  BROADCAST
  NAK
  ERROR
  Invalid primitives Exemplary Transmission Errors:
  Send a bad CRC for a frame
  Send bad disparity
  Coding error ($8b/10b$ error)

Exemplary Framing Errors:
  Unsupported frame type
  Frame with unknown tag
  Xfer_Rdy frame errors
  Data frame errors
  Unsupported frame type
  Wrong Destination SAS address
  Wrong Hashed SAS address
  Invalid frame type Exemplary Timeouts:
  COMSAS detect timeout
  Await ALIGN timeout
  Hot-Plug timeout
  Dword Synchronization Reset timeout
  Receive Identify timeout
  Open timeout
  BREAK timeout
  CLOSE timeout
  ACK/NAK timeout
  DONE timeout
  Credit timeout Those of ordinary skill in the art will recognize other anomalous conditions that may be simulated in accordance with features and aspects hereof. For example, the SAS specifications include the above and other conditions that may be simulated for testing purposes in accordance with features and aspects hereof.

Element 408 is then operable to apply the generated stimuli to the second SAS component (the SAS component under test). Element 410 then evaluates the received response from the component under test. In accordance with SAS specifications, each anomalous condition generated and applied as a stimulus to the second SAS component should generate some appropriate response. Element 410 is therefore responsible for receiving the response (if any) and verifying its proprietary in accordance with SAS specifications. Element 412 then determines whether the requested test mode has been completed. If the test request includes indicia requesting multiple or repetitive test operations, processing continues by looping back to element 404 to perform further requested test operations. If element 412 determines that the requested test mode has been completed, element 414 is operable to report or otherwise return the test results to the test requestor. The test results may be returned or reported in any suitable fashion according to the needs of the particular application of the test mode features hereof. Simple pass/fail indicators (i.e., LED indicators on the first SAS component that performed the test) may be utilized to provide indicia of the results of the test mode operation. More complex test reporting features may be provided by other processing (not shown) to format and present the information to an appropriate user or technician. Processing then continues by looping back to element 400 to continue normal operation of the first SAS component until detection of another request for entry to enhance test mode.

Those of ordinary skill in the art will recognize a variety of equivalent methods and processes for performing enhanced test features in accordance with features and aspects hereof. The flowchart a FIG. 4 is therefore intended merely as representative of one possible implementation of such a method.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for testing a SAS component in situ in a SAS domain, the method comprising:
   generating a stimulus within a first SAS component wherein the stimulus represents an anomalous condition in the SAS domain;
   applying the stimulus to a second SAS component coupled to the first SAS component;
   receiving within the first SAS component a response from the second SAS component; and
   verifying within the first SAS component the received response,
   wherein the method is operable while the first SAS component and the second SAS component are operating in situ within the SAS domain.

2. The method of claim 1 wherein the first SAS component is a SAS device controller and the second SAS component is a SAS expander.

3. The method of claim 1 wherein the first SAS component is a SAS expander and the second SAS component is a SAS device controller.

4. The method of claim 1 wherein the step of generating comprises generating an exception primitive.

5. The method of claim 4 wherein the step of generating an exception primitive comprises generating at least one of: BREAK, BROADCAST, NAK, and ERROR.

6. The method of claim 1 wherein the step of generating comprises generating invalid frames.

7. The method of claim.6 wherein the step of generating invalid frames comprises generating at least one of: a frame with a CRC error, an invalid SMP Response frame, an illegal frame type, a frame with an invalid SAS address, a frame representing an invalid SAS protocol, a frame indicating an invalid connection rate, a character representing an invalid primitive, and a frame with an invalid SMP function.

8. The method of claim 1 further comprising: configuring the first SAS component to enable testing operation.

9. The method of claim 8 wherein the step of configuring comprises:
   transmitting an SMP Request to the first SAS component requesting that the first SAS component commence testing operation of the second SAS component.

10. The method of claim 9 wherein the SMP Request is a vendor specific SMP Request.

11. A system comprising:
   a SAS communication medium;
   a first SAS component coupled to the SAS communication medium;
   a second SAS component coupled to the SAS communication mediums,
   wherein the second SAS component is adapted to generate a stimulus representing an anomalous condition within a SAS domain including the first and second SAS components,
   wherein the second SAS component is further adapted to apply the generated stimulus to the first SAS component, and
   wherein the first and second SAS components are operating in situ in the SAS domain.

12. The system of claim 11 wherein the second SAS component is further adapted to verify a response received from the first SAS component in response to the generated stimulus applied to the first SAS component.

13. The system of claim 11 wherein the first SAS component is a SAS device controller and the second SAS component is a SAS expander.

14. The system of claim 11 wherein the first SAS component is a SAS expander and the second SAS component is a SAS device controller.

15. The system of claim 11 wherein the second SAS component is adapted to selectively enable generation of the stimulus.

16. The system of claim 15 wherein the second SAS component is selectively enabled to generate the stimulus in response to a vendor specific SMP Request received by the second SAS component.

17. A system for testing a SAS component in situ in a SAS domain, the system comprising:
   means for generating a stimulus within a first SAS component wherein the stimulus represents an anomalous condition in the SAS domain;
   means for applying the stimulus to a second SAS component coupled to the first SAS component;
   means for receiving within the first SAS component a response from the second SAS component; and
   means for verifying within the first SAS component the received response,
   wherein the first and second SAS components are operating in situ in the SAS domain.

18. The system of claim 17 wherein the first SAS component is a SAS device controller and the second SAS component is a SAS expander.

19. The system of claim 17 wherein the first SAS component is a SAS expander and the second SAS component is a SAS device controller.

20. The system of claim 17 further comprising:
means for configuring the first SAS component to enable testing operation.

21. The system of claim 20 wherein the means for configuring comprises:
means for transmitting an SMP Request to the first SAS component requesting that the first SAS component commence testing operation of the second SAS component.

22. The system of claim 21 wherein the SMP Request is a vendor specific SMP Request.

* * * * *